United States Patent [19]

Trew et al.

[11] Patent Number: 4,965,667
[45] Date of Patent: Oct. 23, 1990

[54] METHOD AND APPARATUS FOR PROCESSING SIGNALS CONVEYED IN SUB-SAMPLED FORM BY WAY OF A TRANSMISSION CHANNEL OR RECORD CARRIER

[75] Inventors: Timothy I. P. Trew, Horley, England; Franciscus W. P. Vreeswijk, Eindhoven, Netherlands

[73] Assignee: U.S. Philips Corporation, New York, N.Y.

[21] Appl. No.: 281,294

[22] Filed: Dec. 7, 1988

[30] Foreign Application Priority Data

Dec. 22, 1987 [GB] United Kingdom ............... 8729878

[51] Int. Cl.$^5$ .......................................... H04N 7/12
[52] U.S. Cl. ................................. 358/138; 358/105; 358/141
[58] Field of Search ............... 358/138, 141, 140, 12, 358/13, 133, 105

[56] References Cited

U.S. PATENT DOCUMENTS

| | | | |
|---|---|---|---|
| 4,713,688 | 12/1987 | Güther | 358/141 |
| 4,745,458 | 5/1988 | Hirano et al. | 358/105 X |
| 4,785,348 | 11/1988 | Fonsalas et al. | 358/12 X |
| 4,845,561 | 2/1989 | Doyle et al. | 358/141 |

OTHER PUBLICATIONS

"Analyse de Structures de Sais-Echantillonage Spatio-Temporel d'un Signal TVHD en Vue de sa Transmission Dans an Canal MAG", TVHD Ottawa Convention, Oct. '87; Bernand et al.

Primary Examiner—Vic Kostak
Attorney, Agent, or Firm—Michael E. Marion

[57] ABSTRACT

A receiver for a high definition television signal in which the signal prior to transmission is sub-sampled on a block-by-block basis according to the movement has an input (39) which receives the sub-sampled signal which is applied to a shuffler (40) which shuffles the pixels of blocks in a manner which is the inverse to that performed prior to transmission. The correctly positioned pixels are applied to means (43,44,45) for adaptive switched interpolation filtering capable of providing spatial frequency filter responses which approximate those at the transmitter, for sub-sampling blocks of the interpolated picture are sub-sampled but where pixels adjacent but outside a block are sub-sampled with the same structure as that of the block and for non-adaptive switched interpolation filtering for providing spatial frequency filter responses which substantially correspond to those at the transmitter. An output (46) provides the reproduced high definition television signal. A digitally assisted television signal at a further input 41 is used to control the inverse shuffling and the selection of filter responses.

45 Claims, 8 Drawing Sheets

METHOD AND APPARATUS FOR PROCESSING SIGNALS CONVEYED IN SUB-SAMPLED FORM BY WAY OF A TRANSMISSION CHANNEL OR RECORD CARRIER

BACKGROUND OF THE INVENTION

The present invention relates to a method and receiving apparatus for processing signals conveyed in sub-sampled form by way of a transmission channel or record carrier. Such a signal may be a high definition television signal. The invention also relates to a method and apparatus for generating such a sub-sampled television signal.

A number of proposals have been made for the transmission of high definition television signals one such being in NHK Laboratories Note, Serial No. 304, of September 1984, "A Single Channel HDTV Broadcast System—The MUSE" by Y. Ninomiya, Y. Ohtsuka and Y. Izumi. In this proposal only two conditions are considered when transmitting the television signal namely whether the picture content is stationary or not. We have found that this in itself is not sufficient to properly reproduce the high definition television signal at the receiver.

SUMMARY OF THE INVENTION

It is an object of the invention to provide an improved method and receiving apparatus to handle a sub-sampled signal and also to provide a method of processing and apparatus for providing a television signal to be conveyed to such receiver apparatus.

The present invention provides a method of processing a signal representing a two-dimensional image conveyed in sub-sampled form by way of a transmission channel or record carrier and subjected, prior to said conveyance, to different sampling structures on a segmented basis depending on movement and/or spatial information, said method comprising the steps of:

i. receiving the sub-sampled signal from said transmission channel or record carrier, ii. subjecting each segment of the received signal to adaptive interpolation filtering capable of providing at any time the appropriate one of a number of spatial frequency filter responses each of which approximates one of a plurality of decimation spatial frequency filter responses to which said signal would have been subjected prior to sub-sampling for said conveyance, iii. subjecting the resulting interpolated signal to sub-sampling on a segmented basis depending on the movement and/or the spatial information but where pixels adjacent to but outside a segment are sub-sampled in accordance with a sampling structure relevant to that segment, and iv. subjecting each segment of the resulting sub-sampled signal to non-adaptive interpolation filtering capable of providing at any time the appropriate one of the number of spatial frequency filter responses each of which substantially corresponds to one of the plurality of the said decimation filter responses to reproduce said signal.

The invention additionally provides a method of processing a high definition television signal conveyed in sub-sampled form by way of a transmission channel or record carrier and subjected, prior to said conveyance, to different sampling structures on a block-by-block basis depending on movement and/or spatial information, said method comprising the steps of:

i. receiving the sub-sampled television signal from said transmission channel or record carrier, ii. subjecting each block of the received signal to adaptive interpolation filtering capable of providing at any time the appropriate one of a number of spatial frequency filter responses each of which approximates one of a plurality of decimation spatial frequency filter responses to which said high definition television signal would have been subjected prior to sub-sampling for said conveyance, iii. subjecting the resulting interpolated signal to sub-sampling on a block-by-block basis depending on the movement and/or the spatial information but where pixels adjacent to but outside a block are sub-sampled in accordance with a sampling structure relevant to that block, and iv. subjecting each block of the resulting sub-sampled signal to non-adaptive interpolation filtering capable of providing at any time the appropriate one of the number of spatial frequency filter responses each of which substantially corresponds to one of the plurality of the said decimation filter responses to reproduce said high definition television signal.

Such arrangements have the advantage that the non-adaptive interpolation filters which have stringent specifications as to their frequency and step responses are provided with the uniform sub-sampled input required for them to meet these specifications even when operating near the boundary of an area that was transmitted with the corresponding sub-sampling structure.

Where the received sub-sampled television signal has substantially fewer lines per frame than the high definition television signal from which it is derived the pixels in blocks of said received sub-sampled television signal may be shuffled in an inverse manner to that when performed prior to transmission.

Where the received sub-sampled signal is accompanied by a further signal conveying information as to the movement and/or the spatial information of each block or region said further signal may be used on reception to select both the appropriate adaptive and non-adaptive spatial frequency filter responses.

The invention also provides receiving apparatus for use with a system in which a signal representing a two dimensional image is conveyed in sub-sampled form by way of a transmission channel or record carrier and subjected, prior to said conveyance, to different sampling structures on a segmented basis depending on movement and/or spatial information, said receiving apparatus comprising means for receiving the sub-sampled signal from said transmission channel or record carrier, means for adaptive switched interpolation filtering for providing for each received segment the appropriate one of a number of different spatial frequency filter responses each of which approximates one of a plurality of decimation spatial frequency filter responses to which said signal would have been subjected prior to sub-sampling for the said conveyance, means for sub-sampling the resulting interpolated signal on a segmented basis depending on the movement and/or the spatial information but where pixels adjacent to but outside a segment are sub-sampled in accordance with a sampling structure relevant to that segment, and means for subjecting the resulting sub-sampled signal to non-adaptive switched interpolation filtering for providing for each segment the appropriate one of the said number of different spatial frequency filter responses each of which substantially corresponds to one of the said decimation filter responses, the output of the second mentioned interpolation filtering operation being the reproduced signal.

In addition the invention provides receiving apparatus for use with a system in which a high definition television signal is conveyed in sub-sampled form by way of a transmission channel or record carrier and subjected, prior to said conveyance, to different sampling structures on a block-by-block basis depending on movement and/or spatial information, said receiving apparatus comprising means for receiving the sub-sampled television signal from said transmission channel or record carrier, means for adaptive switched interpolation filtering for providing for each received block the appropriate one of a number of different spatial frequency filter responses each of which approximates one of a plurality of decimation spatial frequency filter responses to which said high definition television signal would have been subjected prior to sub-sampling for the said conveyance, means for sub-sampling the resulting interpolated signal on a block-by-block basis depending on the movement and/or the spatial information but where pixels adjacent to but outside a block are sub-sampled in accordance with a sampling structure relevant to that block, and means for subjecting the resulting sub-sampled signal to non-adaptive switched interpolation filtering for providing for each block the appropriate one of the said number of different spatial frequency filter responses each of which substantially corresponds to one of the said decimation filter responses, the output of the second mentioned interpolation filtering operation being the reproduced high definition television signal.

Where the sub-sampled television signal contains substantially fewer lines per frame than the high definition television signal from which it is derived and where the pixels of blocks of the sub-sampled television signal are shuffled prior to conveyance, said apparatus may additionally comprise means for shuffling the pixels of those blocks of the received sub-sampled television signal in an inverse manner to that prior to conveyance prior to the first mentioned interpolation filtering.

Where the system has a further signal conveying information as to the movement and/or the spatial information of each block or segment is conveyed with said sub-sampled signal, said apparatus may comprise means for receiving said further signal and for applying the information so received to control the first mentioned and the second interpolation filtering operations for selecting the appropriate spatial frequency filter response for each block or segment. This information may also be applied to the shuffling means so as to control the inverse shuffling.

The invention provides in addition a method of processing a high definition television signal for conveyance by way of a transmission channel or record carrier said method comprising the steps of:

i. dividing the picture of said high definition television signal into a plurality of adjacent blocks, ii. determining the degree of movement in each block, iii. subjecting each block to two dimensional spatial filtering the characteristics of which depend on the degree of movement, iv. subjecting each block so filtered to spatial and temporal sub-sampling the structure of which depends on the degree of movement, and v. reducing the number of lines in a sub-sampled block either by the said sub-sampling structure or by subjecting the resulting sub-samples from a block to shuffling to produce a sub-sampled television signal having substantially fewer lines per frame than contained in said high definition television signal.

Such a method provides a compromise between spatial and temporal resolution; stationary and nearly stationary areas are conveyed with high spatial resolution but poor motion portrayal while increasing movement decreases the spatial resolution but improves motion portrayal. This takes advantage of the eye's reduced perception of spatial resolution on moving objects. The use of two dimensional spatial filtering and temporal sub-sampling causes judder rather than blur on objects whose motion is below the detected threshold. This judder may be eliminated in the receiver by non-linear temporal interpolation whereas information lost in blur cannot be accurately recovered.

The above method may additionally have the following steps comprising:

i. subjecting at least those blocks which exhibit movement above a certain threshold to said two dimensional filtering the characteristics of which are additionally dependent on the character of the spatial information, and ii. subjecting each filtered block to spatial and temporal sub-sampling the structure of which additionally depends on the character of spatial information.

This method may further have the step of subjecting each block to spatial and temporal checking, after determining the degree of movement and/or the character of spatial information, to ensure consistency and/or some other benefit.

The invention further provides apparatus for processing a high definition signal for conveyance by way of a transmission channel or record carrier, said apparatus comprising means for dividing the picture of said high definition television signal into a plurality of adjacent blocks, means for determining the degree of movement in each block, means for subjecting each block to two dimensional spatial filtering the characteristics of which are determined by the degree of movement, means for subjecting each block so filtered to spatial and temporal sub-sampling the structure of which depends on the said degree of movement, means for reducing the number of lines in a sub-sampled block and means for producing therefrom a sub-sampled television signal having substantially fewer lines per frame than contained in said high definition television signal.

Such apparatus may additionally comprise means for determining the spatial information in each block, the means for subjecting each filtered block to spatial and temporal sub-sampling depending not only on the degree of movement in a block but also the character of its spatial information.

The invention additionally provides an interpolation filter arrangement.

BRIEF DESCRIPTION OF THE DRAWINGS

The above and other features of the invention will now be described, by way of example, with reference to the accompanying drawings, in which:

FIG. 5 is a block diagram of one branch of the equipment of FIG. 1, FIGS. 6a–6c, 7a–7c, 8a–8c and 9a–9c are diagrams for explaining the operation of the branch of FIG. 5.

DETAILED DESCRIPTION OF THE INVENTION

The invention will be described in relation to a television signal of the MAC-packet type which has been adapted for high definition television (HDTV) where although the signal source may provide a 1250 lines, 50 Hz field rate, 2:1 interlaced signal the signal actually transmitted will have 625 lines, 50 Hz field rate, 2:1 interlaced so that it can be received by non-HDTV receivers. The transmitted vision signal will be accompanied by a digital signal giving additional information as to the vision signal and such a system is sometimes referred to by the term Digital Assisted Television (DATV). In the following description it will be assumed that each picture is divided into a number of blocks each a given number of pixels wide by a given number of lines high, which numbers need not correspond, and that the digital information relates to a character or characteristics of each block such as movement and its rate.

With such a transmission system where the signal is derived from a 1250 lines 25 MHz high definition television camera and where the transmission channel is 625 lines, 6 MHz bandwidth, an overall compression of 4:1 is required. The system used to sample the high definition signal ready for transmission makes a compromise between discarding temporal and spatial resolution as shown in the following examples:

| System Period | Temporal Compression | Spatial Compression |
| --- | --- | --- |
| 80 msec | 2:1 | 2:1 |
| 40 msec | 2:1 | 2:1 |
| 20 msec | 1:1 | 4:1 |

Thus several different field rates are used for different velocity ranges as follows:

i. In a stationary mode (velocity range: 0–0.5 pixels/40 msec) the field rate is 12.5 Hz and the basic interval is 80 msec.

ii. In a slowly moving mode (velocity range: 0.5–2 pixels/40 msec) the field rate is 25 Hz and the basic interval is 40 msec.

iii In a moving mode (velocity range: above 2.0 pixels/40 msec) the field rate is 50 Hz and the basic interval is 20 msec.

Figure 1:
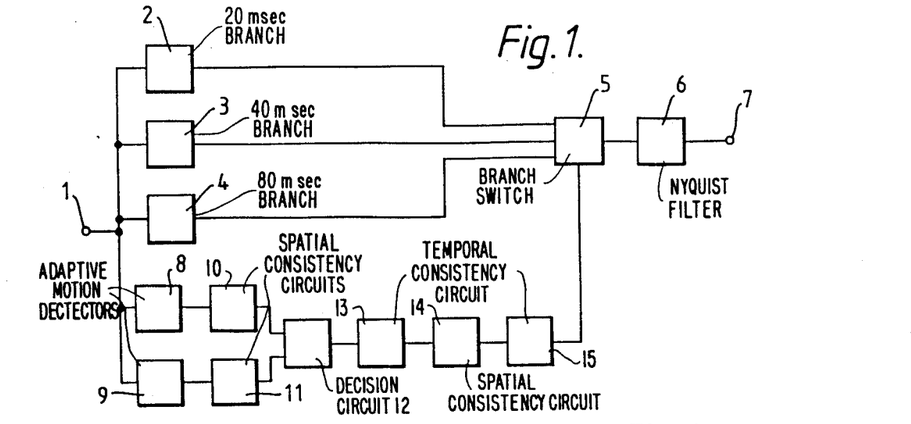
FIG. 1 is a block diagram of television signal generating equipment according to the invention, FIGS. 2a–2c, 3a–3c and 4a–4c' are diagrams for explaining the operation of the equipment of FIG. 1.

FIG. 1 is a block diagram of transmission equipment for use with such a system where reference 1 indicates an input terminal which receives at least the luminance information from a high definition television camera. This luminance information is applied to three parallel branches 2, 3 and 4 which are respectively the 20 msec, 40 msec and 80 msec branches in which the signal will be processed in a manner to be described. The outputs from these three branches are applied to a branch switch 5 the output of which is derived from one of the branches and is applied by way of a nyquist filter 6 to an output terminal 7 for multiplexing with the other components of the MAC signal prior to its application to a transmission channel or record carrier, the further processing involved not being shown. FIG. 1 also does not show the generation of the digital signal for DATV which conveys in the transmission information such as the nature of the sampling, movement, etc.

The luminance information at input terminal 1 is also applied to first and second transient adaptive motion detectors 8 and 9 the first such detector (8) producing an output where the motion detected is less than 0.5 pixels/40 msec while the second such detector (9) produces an output when the motion detected is greater than 2 pixels/40 msec. The outputs of the motion detectors 8 and 9 are applied to respective first and second spatial consistency circuits 10 and 11 which determine consistency between adjacent and surrounding blocks and whose outputs are applied to a three level decision circuit 12 to produce an output corresponding to one of the three conditions (i) to (iii) as described above. This output is applied to a first temporal consistency circuit 13, which controls the time at which any change in signal level from the decision circuit 12 is passed on depending on the degree of movement, via a further spatial consistency circuit 14 which determines consistency between a block and its surrounding blocks and a second temporal consistency circuit 15, which ensures temporal consist a relatively long period (240 msec) to avoid switching artifacts, to the control input of the branch switch 5 to control the selection of the processed signal according to the above criteria.

Figure 2A:
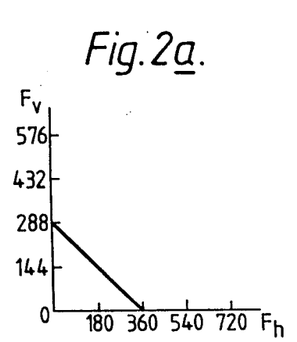
Figure 2B:
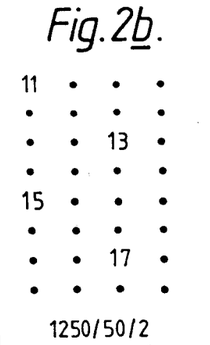
Figure 2C:
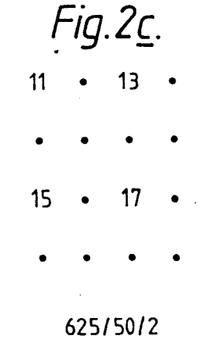

In one form the 20 msec branch 2 may consist of a two-dimensional low-pass filter, a sub-sampling unit and a shuffling unit. The frequency response of the low-pass filter has a diamond-like form one quadrant of which is shown in FIG. 2a. This filter is an intra-field filter, and has an ideal cut-off frequency point at fs/4 (where fs denotes the high definition sampling frequency). In FIG. 2a Fv is given in cycles per picture height while Fh is given in cycles per picture width. The sub-sampling structure is shown in FIG. 2b while the shuffling of the sampled pixels to be transmitted is shown in FIG. 2c. In these two figures the numbers represent pixels where the first index indicates the number of the field while the second index indicates the line number.

Figure 3A:
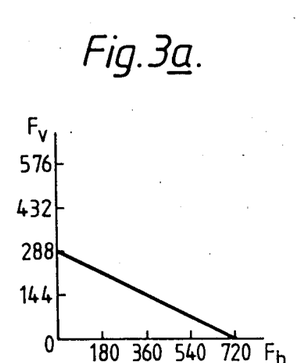
Figure 3B:
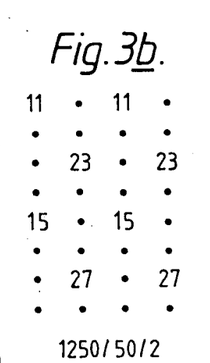
Figure 3C:
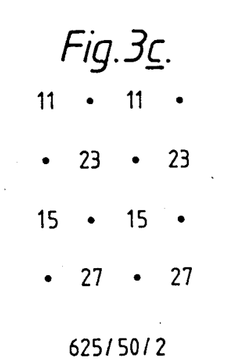

The 40 msec branch 3 may consist of a switch, a two-dimensional low-pass filter, a sub-sampling unit and a shuffling unit. The switch selects one field out of each pair of interlaced fields and thus can be used for the slowly moving mode. The frequency response to the low-pass filter for this branch also has a diamond-like form one quadrant of which is shown in FIG. 3a. The filter is again an intra-field filter, and has an ideal cut-off frequency point at fs/2. The sub-sampling structure is shown in FIG. 3b and the shuffling of pixels to be transmitted is shown in FIG. 3c (in fact no additional shuffling is required and thus the shuffling unit will also not be required).

Figures 4A, 4B, 4C, 5:
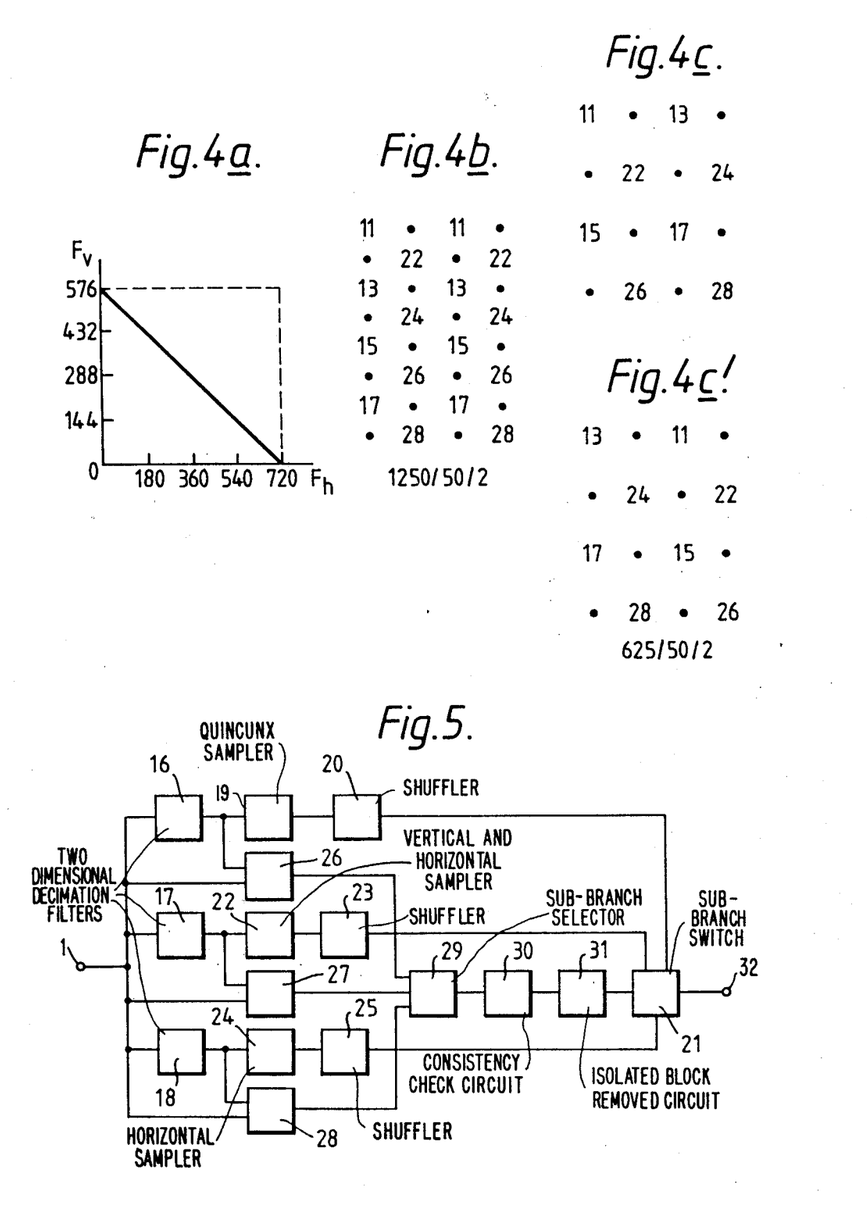

The 80 msec branch 4 consists of a switch, a two-dimensional low-pass filter, a sub-sampling unit and a shuffling unit. The switch selects the first two fields out of four successive fields. These two fields are stored and the two-dimensional filter is applied, the filter having a further diamond-like form one quadrant of which is shown in FIG. 4a as a continuous line, the broken line indicating the frequency response of the source for the HDTV signal. This filter is an intra-frame filter and has an ideal horizontal cut-off frequency point at fs/2. The sub-sampling structure is shown in FIG. 4b while the shuffling of the pixels to be transmitted during a first of two frames is shown in FIG. 4c while those for the second of such frames is shown in FIG. 4c'.

For the three branches described so far quincunx sampling structures have been used but it has been found that the sampling patterns are optimised for high horizontal and vertical resolution at the expense of diagonal resolution. Pictures for transmission contain some spatial structure for which this is not the most appropriate form of sampling and thus it is proposed to provide a number of selective sub-branches, at least for the 20 msec and 40 msec branches 2 and 3, each providing a different sub-sampling structure which can support different spatial frequencies with the transmission equipment selecting the pattern that best represents the frequencies in an area (block) of the picture. In such a case the 20 msec branch 2 in FIG. 1 could be replaced by the arrangement illustrated in the block diagram of FIG. 5.

Figure 6A:
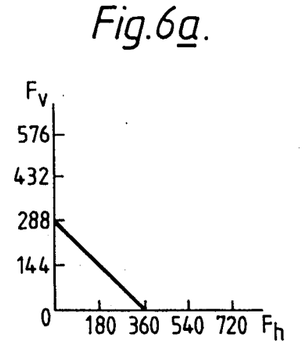
Figure 6B:
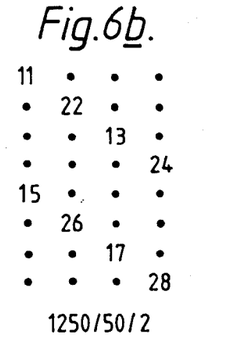
Figure 6C:
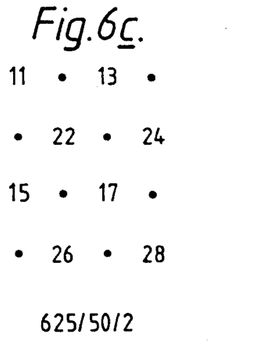

In FIG. 5 the high definition signal at terminal 1 is applied to three two-dimensional decimation filters 16, 17 and 18 each having a different frequency response, one quadrant for that for filter 16 being shown in FIG. 6a and corresponding to the response shown in FIG. 2a where both the vertical and horizontal cut-off frequency points at at Fs/4. The output of filter 16 is applied to a quincunx sampler 19 which can provide a sampling structure as shown in FIG. 6b, the samples being applied to a shuffler 20 which shuffles the samples in the manner shown in FIG. 6c. The output of shuffler 20 is applied to one input of a sub-branch switch 21 whose output forms the output of the 20 msec branch.

Figure 7A:
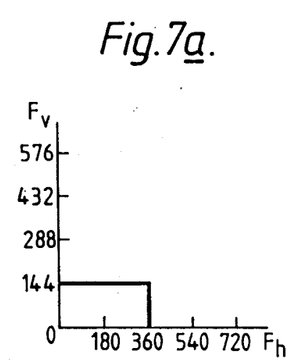
Figure 7B:
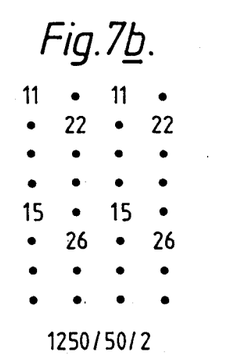
Figure 7C:
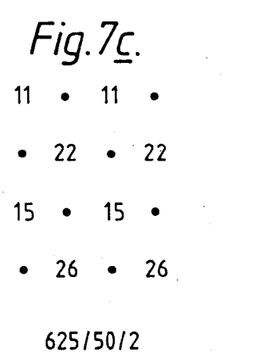

One quadrant of the frequency response of the decimation filter 17 is shown in FIG. 7a where the vertical cut-off frequency is Fs/8 while that in the horizontal direction in Fs/4. The output of filter 17 is applied to a vertical and horizontal sampler 22 the sampling structure for which might be as shown in FIG. 7b, while the sampled output is applied to a further shuffler 23 which shuffles the samples in the manner shown in FIG. 7c. The output of this shuffler is applied to a second input of the sub-branch switch 21.

Figure 8A:
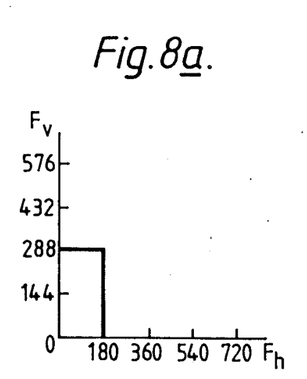
Figure 8B:
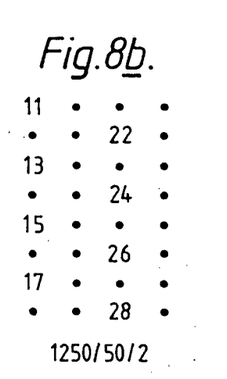
Figure 8C:
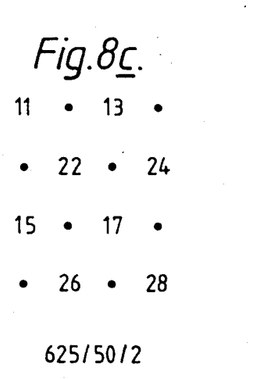

FIG. 8a shows one quadrant of the frequency response for the filter 18 whose output is applied to a horizontal sampler 24 whose sampling structure might be as shown in FIG. 8b and whose output is shuffled in a further shuffler 25 in the manner shown in FIG. 8c and the output of the shuffler applied to a third input of the sub-branch switch 21.

Figure 9A:
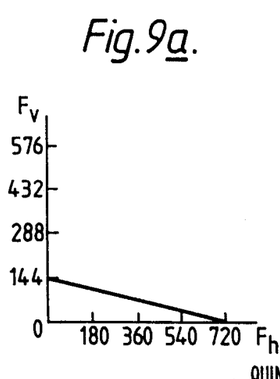
Figure 9B:
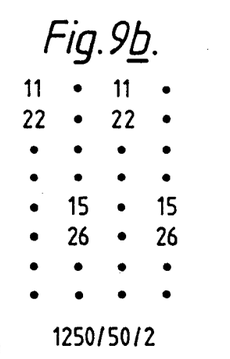
Figure 9C:
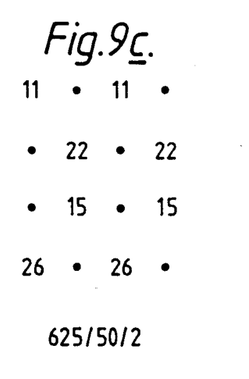

Although provision is not shown in FIG. 5, one of the sub-branches, or an additional sub-branch could provide filtering for full horizontal resolution. In such a case one quadrant of the frequency response would be as shown in FIG. 9a while the sampling structure and sample shuffling could be as shown in FIGS. 9b and 9c respectively. Other filter responses and sampling structures are also possible.

The input at terminal 1 is also applied to first inputs of first, second and third square/difference calculation units 26, 27 and 28 to determine the spatial frequency characteristic which is the best match to the input signal at terminal 1 and whose other input is connected to the output of the respective low pass filters 16, 17 and 18. The outputs of the calculation units 26, 27 and 28 are connected to respective inputs of a biased sub-branch selector 29 whose output represents the selected sub-branch and which after passing through a temporal and spatial consistency check circuit 30 to remove switching artifacts and an isolated block removal circuit 31 to remove inconsistent blocks is applied to the control input of the sub-branch switch 21 for selecting the sampled signal from the appropriate sub-branch, this output being applied via a terminal 32 for application to one input of the branch switch 5 (FIG. 1).

Figure 10:
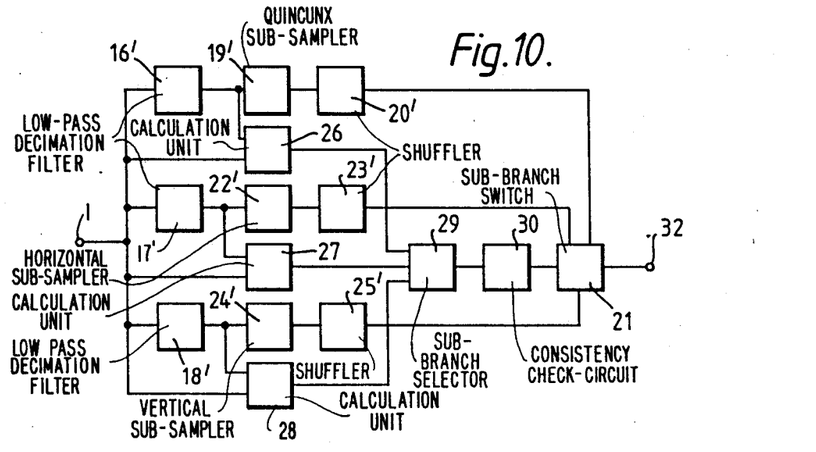
FIG. 10 is a block diagram of a further branch of the equipment of FIG. 1, FIGS. 11a–11c, 12a–12c, 13a–13c, 14a–14c and 15a–15c are diagrams for explaining the operation of the branch of FIG. 10.
Figure 11A:
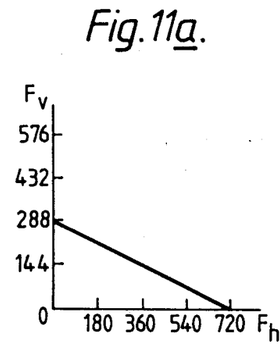
Figure 11B:
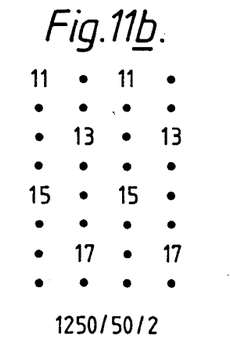
Figure 11C:
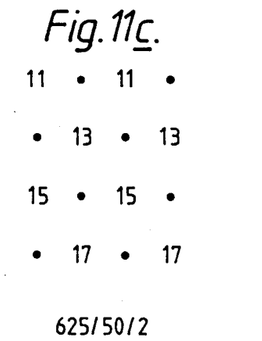
Figure 12A:
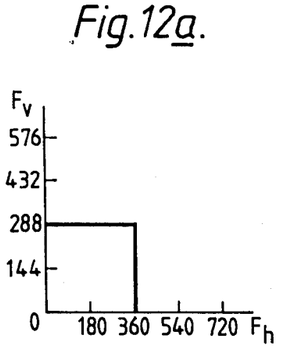
Figure 12B:
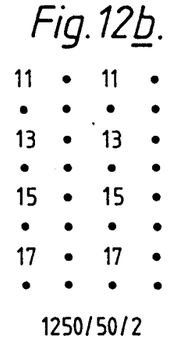
Figure 12C:
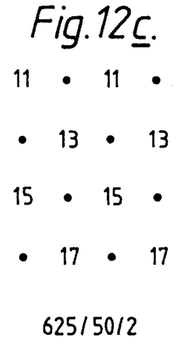
Figure 13A:
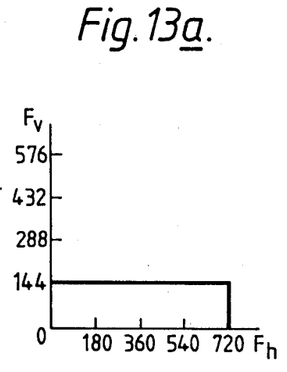
Figure 13B:
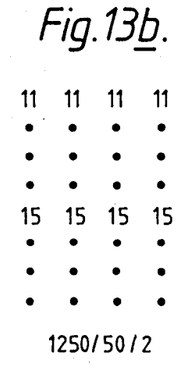
Figure 13C:
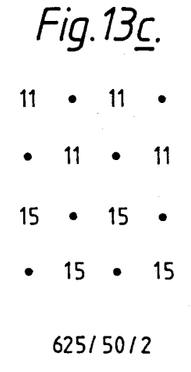
Figure 14A:
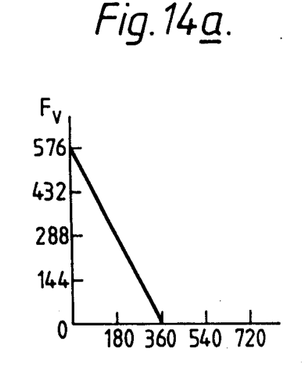
Figure 14B:
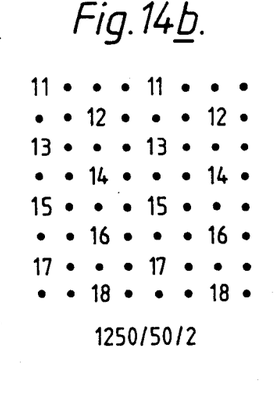
Figure 14C:
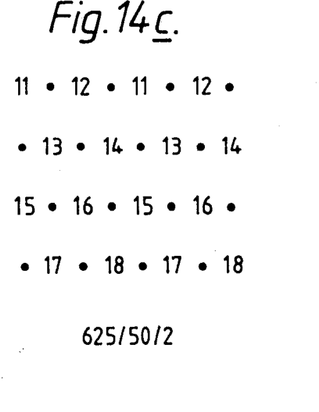
Figure 15A:
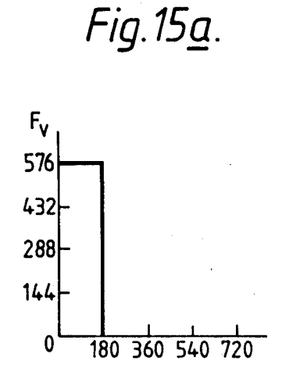
Figure 15B:
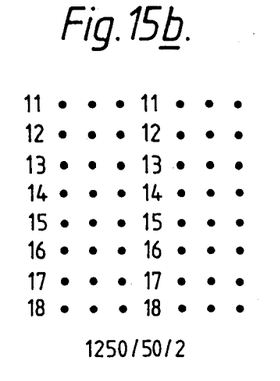
Figure 15C:
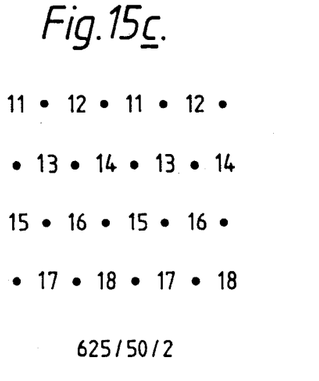

FIG. 10 is a block diagram of a sub-sampling arrangement for a 40 msec branch that can replace the 40 msec branch 3 in FIG. 1. It will be noted that the arrangement shown in FIG. 10 is very similar to that of the 20 msec sub-branch arrangement of FIG. 5 and corresponding reference numerals indicate like or similar block functions. Where there is a difference in function the block reference is distinguished by the addition of a prime. One quadrant of the frequency response of low-pass decimation filter 16' is shown in FIG. 11a where the vertical cut-off frequency is Fs/4 and that in the horizontal direction is Fs/2 and in the same as that shown in FIG. 3a. A quincunx sampling structure and shuffling pattern for quincunx sub-sampler 19' and shuffler 20' are shown in FIGS. 11b and 11c respectively. One quadrant of the frequency response of the low-pass decimation filter 17' is shown in FIG. 12a for which the cut-off frequency in both the vertical and horizontal directions is Fs/2 while a sampling structure and shuffling pattern for a horizontal sub-sampler 22' and shuffler 23' are shown in FIGS. 12b and 12c respectively. FIGS. 13a, 13b and 13c show the corresponding plots for low-pass decimation filter 18' vertical sub-sampler 24' and shuffler 25', the filter response corresponding to that shown in FIG. 9a.

The filter frequency responses, sampling structures and shuffling arrangements described above for the three sub-branches of the 40 msec branch can be used, in addition to the slowly moving mode, with film (telecine) where the number of frames of the film per second corresponds to the number of pictures of the television signal so that each film frame is the same during the two fields of a frame. In such a case two further filter frequency responses sampling structures and resulting shuffling arrangements could be used, these being shown in FIGS. 14 and 15 where a is one quadrant of the frequency response, b a sampling structure and c is the shuffling arrangement.

Figure 16:
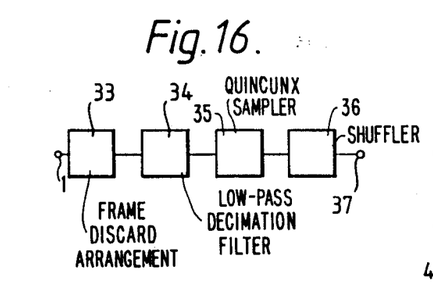
FIG. 16 is a block diagram of one further branch of the equipment of FIG. 1, FIG. 17, is a block diagram of television receiving apparatus according to the invention.

FIG. 16 is a block diagram showing the 80 msec branch 4 of FIG. 1 in greater detail. The signal input 1 is connected to a frame discard arrangement 33 which performs temporal sub-sampling by discarding alternate frames of the high definition television signal, the remaining frames being applied to a low-pass decimation filter 34 having the frequency response shown in FIG. 4a. The filter output is applied to a quincunx sampler 35 which has the sampling structure as shown in FIG. 4b while the sampled signal is applied to a shuffler 36 which shuffles the samples in the manner shown in FIG. 4c. The shuffler output forms the output of the 80 msec branch which appears at a terminal 37 which forms one of the inputs to the branch switch 3 of FIG. 1.

Figure 17:
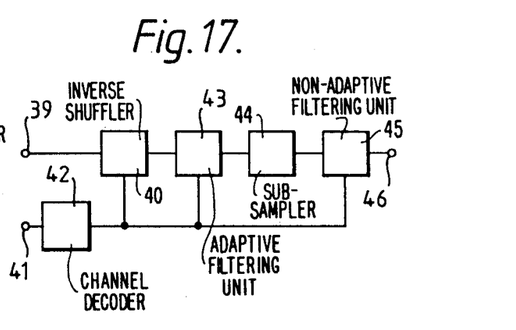

FIG. 17 is a block diagram of part of a receiving equipment for receiving a 625 lines, 50 fields per second, 2:1 interlaced which has been processed on the transmission side in the manner so far described. This figure does not disclose the normal "front-end" processing of the received signal, namely frequency selection, frequency changing and demodulation of the received signal as these are processes which are in themselves well known and not essential for an understanding of the present invention. In addition the separation of the various components of the MAC signal are also not shown as again this is also not essential for the present understanding. The resulting vision (luminance) signal is applied via a terminal 39 to an inverse shuffler 40 in which the transmitted samples are restored to their correct positions which they occupied prior to shuffling in the transmission equipment on a block-by-block basis. The nature of the inverse shuffling is controlled from a digital assisting signal (DATV) present at a terminal 41 after demodulation from the received MAC signal in the earlier part of the receiver, the DATV signal being applied to a channel decoder 42 in which the DATV signal is decoded to provide the appropriate control signals to the inverse shuffler 40 and other units yet to be described. The inverse shuffler produces a 1250 lines, 50 fields per second, 2:1 interlaced signal of coarse structure which is applied to a unit 43 providing adaptive switched interpolation filtering the spatial frequency filtering characteristics being controlled on a block-by-block basis by the control signal from the decoder 42. The spatial frequency filter characteristics in unit 43 approximates the spatial frequency characteristic of the filters employed in the transmission equipment for the branches or sub-branches. The filters so applied are normalised from pixel to pixel and all filter coefficients are arranged to be positive. The unit 43 produces a roughly interpolated picture where additional pixels are generated for those pixel points for which a sampled pixel has not been received though the sampled pixels are not changed.

The resulting output of the switched filter unit 43 is applied to a sub-sampler 44 in which the previously interpolated signal is again sub-sampled with the manner of sub-sampling being the same as that as in the transmission equipment for that block. This sub-sampling structure is extended into adjacent blocks to present the following non-adaptive switched interpolation filtering unit 45 with a uniform sub-sampling structure around each block. A particular block might be re-sub-sampled with several structures corresponding to those used for itself and its neighbours at the transmitter. The spatial frequency filter characteristics in filtering unit 45 substantially correspond to the spatial frequency characteristics of the filters employed in the transmission equipment for the branches or sub-branches, these characteristics being switched under the control of the signals from the decoder 42. The fully interpolated 1250 lines signal from the filtering unit 45 is applied to an output terminal 46 for producing a high definition display.

Figure 18:
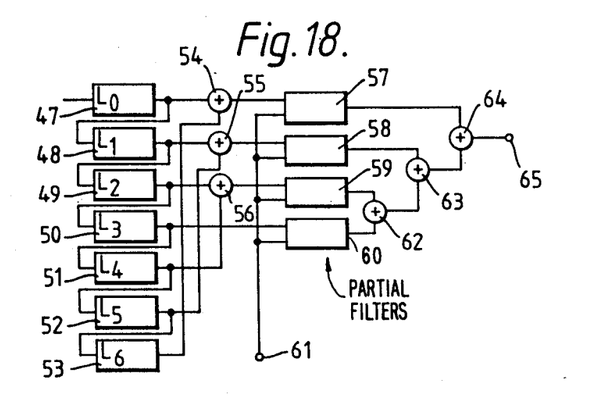
FIGS. 18 and 19 are diagram of a filter arrangement for use with the apparatus of FIG. 17.

The adaptive switched interpolation filter unit 43 of FIG. 17 may comprise a number of switched filters depending on the number of branches or sub-branches in the transmission equipment. For the transmission equipment described in relation to FIGS. 5, 10 and 16 seven switched filters will be required with positive coefficients with dynamically adjustable gains. A construction for such a switched filter is shown in FIG. 18 which comprises seven sequentially connected line period stores indicated by the reference 47 through to 53 arranged to receive and deliver lines of the television signal from the inverse shuffler 40 (FIG. 17) on a first-in first-out basis (FIFO). Three adder circuits 54, 55 and 56 each add the outputs of a pair of line stores as shown and the resulting added signals are applied to respective partial filters 57, 58 and 59 while a further partial filter 60 receives its input direct from line store 50. A terminal 61 receives the control signals from the decoder 42 (FIG. 17) either directly or after further processing and applies these as a coefficient control to the partial filters 57, 58, 59 and 60. The outputs of partial filters 59 and 60 are added in an adder circuit 62 whose output is added with the output of partial filter 58 in a further adder circuit 63. The output of this latter adder circuit is added to the output of partial filter 57 in an adder circuit 64 whose output at terminal 65 is the output of the filter.

Figure 19:
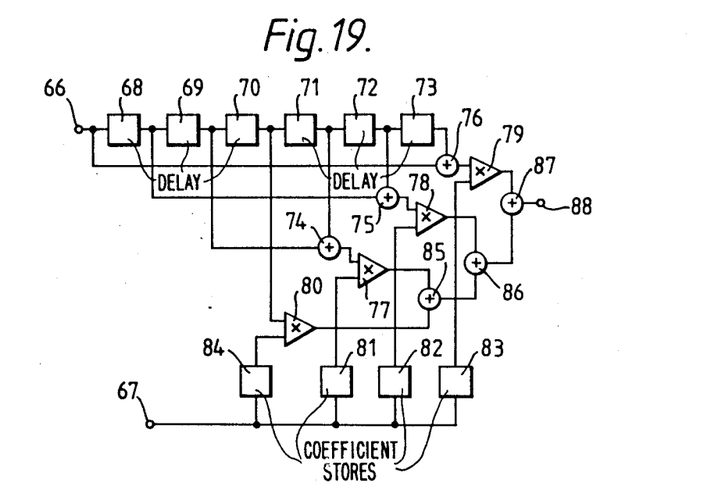

FIG. 19 shows a construction for a partial filter 57, 58, 59 or 60 of FIG. 18. In FIG. 19 the reference 66 indicates the reference for the signal input to the filter while 67 indicates the coefficient control input. Signal input 66 is connected to sequentially connected delays given the references 68 through to 73 each have a delay period corresponding to the interval between pixels. The input 66 and the outputs from delays 68, 69, 71 to 73 are connected in pairs in the manner shown to three adder circuits 74, 75 and 76 whose outputs are connected to the first input of respective multipliers 77, 78 and 79 while the first input of a further multiplier 80 is connected to the output of delay 70. The second inputs of the multipliers 77, 78, 79 and 80 is connected to the output of a respective coefficient store 81, 82, 83 and 84 whose inputs are connected to the coefficient control input 67. The outputs of multipliers 77 and 80 are added in an adder circuit 85 whose output is added to that from multiplier 78 in a further adder circuit 86. The output of adder circuit 86 is added to the output of multiplier 79 in an adder circuit 87 whose output at 88 forms the output of the partial filter.

The filtering unit of FIG. 17 and the particular filter of FIGS. 18 and 19 provides adaptive gain adjustment by dynamically adjusting the d.c. gain of each filter. Two methods of determining the necessary gain, an a priori method and an a posteriori method, will be described.

Figure 20A:
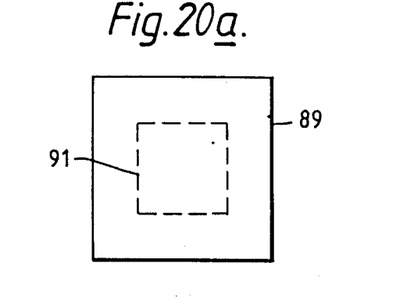
FIG. 20 is a diagram for explaining the operation of part of the apparatus of FIG. 17.
Figure 20B:
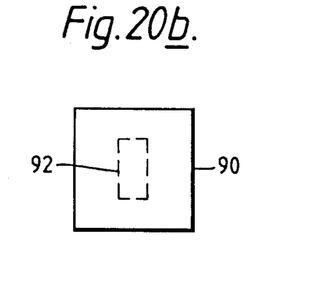
Figure 21:
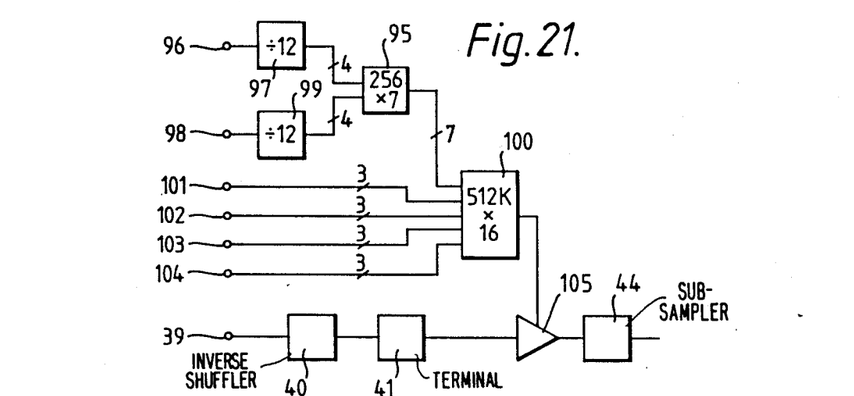
FIG. 21 is a block diagram of part of the apparatus of FIG. 17.

The a priori method for renormalisation uses information available before interpolation, namely the branch or sub-branch selection for the current and adjacent blocks and the position of are shown in FIGS. 20a and 20b where FIG. 20a represents a block 89 which is 12 pixels wide by 12 lines high while FIG. 20b represents a block 90 which is 8 pixels by 8 lines high. These two figures show a central area 91, 92 surrounded by the long linked lines for which the gain is independent of the surrounding blocks since the range of the interpolation filter falls entirely within the block. Removing the central area 91 a 12 x 12 block has potentially $$144 - 36 + 1 = 109$$

positions with unique gains which may be represented within a 7 bit code, so an initial mapping may be achieved with a 256x7 bit memory 95 as shown in FIG. 21. This memory is driven from a pixel clock input 96 via a divide-by-12 divider 97 which provides a 4-bit horizontal position input and from a line clock input 98 via a further divide-by-12 divider 99 which provides a 4-bit vertical position input. The gains are also affected by the sub-branches used in neighbouring blocks and it is quite simple to isolate the nearest selection horizontally, vertically and diagonally using shift registers. To describe these 3x4=12 bits are required, together with the selection for the current sub-branch, in a system as described with a total of seven channels. When combined with the 7 bits describing the position within the block this gives a total of 19 bits. This corresponds with the 512K words of memory 100 also present in FIG. 21 to select the gain of the filter. The inputs to memory 100 are the 7 bits from memory 95, 3 bits at a terminal 101 representing the current block, 3 bits at a terminal 102 representing the vertical neighbouring block, 3 bits at a terminal 103 representing the horizontal neighbouring block and 3 bits at a terminal 104 representing the diagonal neighbouring block.

With a three branch system as shown in FIG. 1 considerably less memory is required and the range of the filters is smaller since the very high resolution sub-branches are not present. If no optimisation is performed then 6 bits would be required to describe the position within the block and 4x2=8 bits to describe the block selection which gives a total of 14 bits and 16K words of memory.

Having determined what the gain should be this can either be achieved by scaling the coefficients before multiplication (see the partial filter of FIG. 19) or using switched coefficients and 10 following the filter unit 43 by a single multiplier 105 to alter the overall gain as shown in FIG. 21, the control input for multiplier 105 being provided by the memory 100. Although with the latter arrangement care needs to be taken to ensure that any rounding errors within the filter unit 43 are not magnified subsequently it does require considerably less memory than controlling the gain of the nine multipliers in the partial filter of FIG. 19.

From the above it will be appreciated that while the a priori method may be acceptable for the three branch system of FIG. 1, it becomes progressively less attractive as sub-branches are added since the number of alternatives rises with the fourth power of the number of bits required to select a sub-branch, this being in addition to any increase in the block size to reduce the amount of DATV data and hence its rate.

Figure 22:
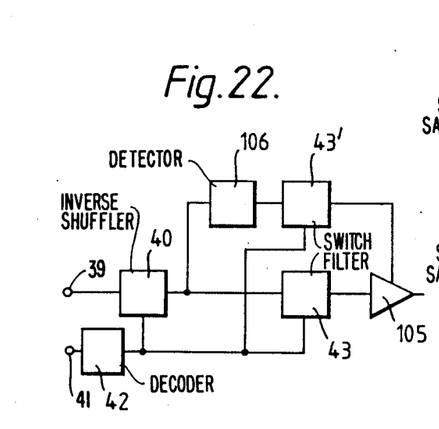
FIG. 22 is a block diagram of an alternative arrangement to that shown in FIG. 21.

The a posteriori gain control method for renormalisation uses two switch filters 43 and 43' in parallel as shown in FIG. 22, the filter 43 performing the filtering operation while the other filter 43' calculates the renormalisation factor. If the conventional range of 16 to 235 is used to represent the video levels from black to white, and zeros are inserted in missing pixel positions during the inverse shuffle, then it is reasonable to assume that only non-zero values represent transmitted values. The second filter 43' takes a 1 bit signal from a detector 106 which detects when the output from the inverse shuffler 40 is greater than 0 and which indicates whether a particular sample has been transmitted, as its input and its output will be the sum of the coefficients that corresponded with active samples. This total is inverted and used to control the gain of the multiplier 105 following the first filter 43.

The hardware for the second filter is reasonably simple since, having folded the filter the coefficients will only be multiplied by 0, 1, 2, 3 or 4, so only small memories are necessary to hold these options for each sub-branch; 2+3 bits are required for a seven channel system, giving a total of 32 words per coefficient. The attractions of this method are twofold. First, the hardware complexity is only determined by the number of coefficients within the first stage interpolation filter 43. Several additional sub-sampling structures are described above which could increase the total number of sub-branches to twelve, without requiring any more coefficients. The only minor increase in hardware is that one additional bit would be necessary to switch the coefficients between the sub-sampling patterns, increasing the total size for each coefficient from 32 words to 64 words. The same change with the a priori system would add four bits, and would increase the memory from 512K words to 8M words. The block size used has no influence on the hardware for the a posteriori renormalisation method. Clearly there is a break-even point at which the additional overhead of the a posteriori system is outweighed by this large memory requirement. A second advantage of the a posteriori method is that it is possible to change the sub-sampling patterns for one channel without any effect on the others, since the filter will adapt automatically to the samples available.

Figure 23:
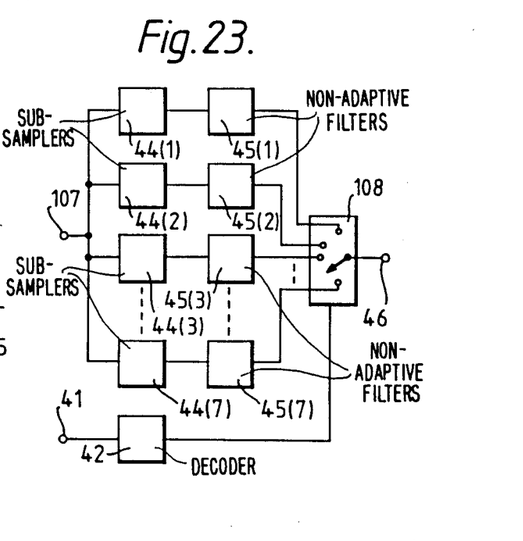
FIG. 23 is a block diagram of a further part of the apparatus of FIG. 17.

The second stage of interpolation comprises, as described in relation to FIG. 17, a sub-sampler 44 and a non-adaptive switched interpolation filter unit 45. A parallel implementation of such an arrangement is shown in FIG. 23 where a terminal 107 corresponds to the output of the first interpolator stage, namely filter unit 43. This output is applied to the inputs of seven sub-samplers 44(1) to 44(7) though in FIG. 23 only four of these are shown so as to simplify the figure. The output of each sub-sampler 44 is applied to an associated non-adaptive filter 45(1) to 45(7) though again only four such filters are actually shown. The seven filters 45 each have a differing spatial frequency response which substantially corresponds to one of the spatial frequency responses in the transmission equipment prior to decimation so that all seven such responses are present in this second stage though renormalised to take their sub-sampling patterns into account. The sub-sampling ensures that the estimates calculated by the first stage of the interpolation (43), are only used where necessary. The outputs of the seven filters 45(1) to 45(7) are connected to respective inputs of a selector switch 108 the control input of which is actuated by the DATV signal from the channel decoder 42. The output of the selector switch 108 provides the high definition output at the output terminal 46.

Although in the above description the receiving apparatus has been described in relation to the reception and processing of high definition television signals such apparatus, suitably modified, may be used to process any signal representing a two dimensional image. Such a signal may be transmitted over a conventional or modified transmission channel or stored on a record carrier.

From reading the present disclosure, other modifications will be apparent to persons skilled in the art. Such modifications may involve other features which are already known in the design, manufacture and use of such methods and apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A method of processing a signal representing a two-dimensional image conveyed in sub-sampled form by way of a transmission channel or record carrier and subjected, prior to said conveyance, to different sampling structures on a segmented basis depending on movement and/or spatial information, said method comprising the steps of:
   i. receiving the sub-sampled signal from said transmission channel or record carrier,
   ii. subjecting each segment of the received signal to adaptive interpolation filtering capable of providing at any time the appropriate one of a number of spatial frequency filter responses each of which approximates one of a plurality of decimation spatial frequency filter responses to which said signal would have been subjected prior to sub-sampling for said conveyance,
   iii. subjecting the resulting interpolated signal to sub-sampling on a segmented basis depending on the movement and/or the spatial information but where pixels adjacent to but outside a segment are sub-sampled in accordance with a sampling structure relevant to that segment, and
   iv. subjecting each segment of the resulting sub-sampled signal to non-adaptive interpolation filtering capable of providing at any time the appropriate one of the number of spatial frequency filter responses each of which substantially corresponds to one of the plurality of the said decimation filter responses to reproduce said signal.

2. A method as claimed in claim 1, in which said received sub-sampled signal is accompanied by a further signal conveying information as to the movement and/or the spatial information of each block or segment, said further signal being used on reception to select both the appropriate adaptive and non-adaptive spatial frequency filter responses.

3. A method of processing a high definition television signal conveyed in sub-sampled form by way of a transmission channel or record carrier and subjected, prior to said conveyance, to different sampling structures on a block-by-block basis depending on movement and/or spatial information, said method comprising the steps of:
   i. receiving the sub-sampled television signal from said transmission channel or record carrier,
   ii. subjecting each block of the received signal to adaptive interpolation filtering capable of providing at any time the appropriate one of a number of spatial frequency filter responses each of which approximates one of a plurality of decimation spatial frequency filter responses to which said high definition television signal would have been subjected prior to sub-sampling for said conveyance,
   iii. subjecting the resulting interpolated signal to sub-sampling on a block-by-block basis depending on the movement and/or the spatial information but where pixels adjacent to but outside a block are sub-sampled in accordance with a sampling structure relevant to that block, and
   iv. subjecting each block of the resulting sub-sampled signal to non-adaptive interpolation filtering capable of providing at any time the appropriate one of the number of spatial frequency filter responses each of which substantially corresponds to one of the plurality of the said decimation filter responses to reproduce said high definition television signal.

4. A method as claimed in claim 3 in which the received sub-sampled television signal has substantially fewer lines per frame than the high definition television signal from which it is derived, wherein the pixels in blocks of said received sub-sampled television signal are shuffled in an inverse manner to that when performed prior to transmission.

5. A method as claimed in claim 4, in which said received sub-sampled signal is accompanied by a further signal conveying information as to the movement and/or the spatial information of each block or segment, said further signal being used on reception to select both the appropriate adaptive and non-adaptive spatial frequency filter responses.

6. A method as claimed in claim 5, in which said further signal is also used on reception for performing the inverse shuffling operation.

7. A method as claimed in claim 3, in which said received sub-sampled signal is accompanied by a further signal conveying information as to the movement and/or the spatial information of each block or segment, said further signal being used on reception to select both the appropriate adaptive and non-adaptive spatial frequency filter responses.

8. Receiving apparatus for use with a system in which a signal representing a two dimensional image is conveyed in sub-sampled form by way of a transmission channel or record carrier and subjected, prior to said conveyance, to different sampling structures on a segmented basis depending on movement and/or spatial information, said receiving apparatus comprising means for receiving the sub-sampled signal from said transmission channel or record carrier, means for adaptive switched interpolation filtering for providing for each received segment the appropriate one of a number of different spatial frequency filter responses each of which approximates one of a plurality of decimation spatial frequency filter responses to which said signal would have been subjected prior to sub-sampling for the said conveyance, means for sub-sampling the resulting interpolated signal on a segmented basis depending on the movement and/or the spatial information but where pixels adjacent to but outside a segment are sub-sampled in accordance with a sampling structure relevant to that segment, and means for subjecting the resulting sub-sampled signal to non-adaptive switched interpolation filtering for providing for each segment the appropriate one of the said number of different spatial frequency filter responses each of which substantially corresponds to one of the said decimation filter responses, the output of the second mentioned interpolation filtering operation being the reproduced signal.

9. Receiving apparatus as claimed in claim 8, for use with a system in which a further signal conveying information as to the movement and/or the spatial information of each block or segment is conveyed with said sub-sampled signal, said apparatus further comprising means for receiving said further signal and for applying the information so received to control the first mentioned and the second interpolation filtering operations for selecting the appropriate spatial frequency filter response for each block or segment.

10. An interpolation filter arrangement for use with a receiving apparatus in a system in which a signal representing a two-dimensional image is conveyed in sub-sampled form by way of a transmission channel or record carrier and subjected, prior to said conveyance, to different sampling structures on a segmented basis depending on movement and/or spatial information, said receiving apparatus comprising means for receiving the sub-sampled signal form said transmission channel or record carrier; said interpolation filter arrangement comprising:
  means for providing for each received segment the appropriate one of a number of different spatial frequency filter responses, each of which approximates one of a plurality of decimation spatial frequency filter responses to which said signal would have been subjected prior to sub-sampling for said conveyance;
  means for sub-sampling the resulting interpolated signal on a segmented basis depending on the movement and/or the spatial information but where pixels adjacent to but outside a segment are sub-sampled in accordance with the sampling structure relevant to that segment; and
  means for subjecting the resulting sub-sampled signal to non-adaptive switched interpolation filtering for providing for each segment the appropriate one of said number of different spatial frequency filter responses, each of which substantially corresponds to one of said decimation filter responses.

11. Receiving apparatus for use with a system in which a high definition television signal is conveyed in sub-sampled form by way of a transmission channel or record carrier and subjected, prior to said conveyance, to different sampling structures on a block-by-block basis depending on movement and/or spatial information, said receiving apparatus comprising means for receiving the sub-sampled television signal from said transmission channel or record carrier, means for adaptive switched interpolation filtering for providing for each received block the appropriate one of a number of different spatial frequency filter responses each of which approximates one of a plurality of decimation spatial frequency filter responses to which said high definition television signal would have been subjected prior to sub-sampling for the said conveyance, means for sub-sampling the resulting interpolated signal on a block-by-block basis depending on the movement and/or the spatial information but where pixels adjacent to but outside a block are sub-sampled in accordance with a sampling structure relevant to that block, and means for subjecting the resulting sub-sampled signal to non-adaptive switched interpolation filtering for providing for each block the appropriate one of the said number of different spatial frequency filter responses each of which substantially corresponds to one of the said decimation filter responses, the output of the second mentioned interpolation filtering operation being the reproduced high definition television signal.

12. Receiving apparatus as claimed in claim 11, for use with a system in which a further signal conveying information as to the movement and/or the spatial information of each block or segment is conveyed with said sub-sampled signal, said apparatus further comprising means for receiving said further signal and for applying the information so received to control the first mentioned and the second interpolation filtering operations for selecting the appropriate spatial frequency filter response for each block or segment.

13. Receiving apparatus as claimed in claim 11 for use with a system in which the sub-sampled television signal contains substantially fewer lines per frame than the high definition television signal from which it is derived and where the pixels of blocks of the sub-sampled television signal are shuffled prior to conveyance, said apparatus additionally comprising means for shuffling the pixels of those blocks of the received sub-sampled television signal in an inverse manner to that prior to conveyance prior to the first mentioned interpolation filtering.

14. Receiving apparatus as claimed in claim 13, for use with a system in which a further signal conveying information as to the movement and/or the spatial information of each block or segment is conveyed with said sub-sampled signal, said apparatus further comprising means for receiving said further signal and for applying the information so received to control the first mentioned and the second interpolation filtering operations for selecting the appropriate spatial frequency filter response for each block or segment.

15. Receiving apparatus as claimed in claim 14, further comprising means for applying the information from said further signal to said shuffling means to control the said inverse shuffling.

16. A method of processing a high definition television signal for conveyance by way of a transmission channel or record carrier said method comprising the steps of:
  i. dividing the picture of said high definition television signal into a plurality of adjacent blocks,
  ii. determining the degree of movement in each block,
  iii. subjecting each block to two dimensional spatial filtering the characteristics of which depend on the degree of movement,
  iv. subjecting each block so filtered to spatial and temporal sub-sampling the structure of which depends on the degree of movement, and
  v. reducing the number of lines in a sub-sampled block either by the said sub-sampling structure or by subjecting the resulting sub-samples from a block to shuffling to produce a sub-sampled television signal having substantially fewer lines per frame than contained in said high definition television signal.

17. A method as claimed in claim 16, additionally comprising:
  i. subjecting at least those blocks which exhibit movement above a certain threshold to said two dimensional filtering the characteristics of which are additionally dependent on the character of the spatial information, and
  ii. subjecting each filtered block to spatial and temporal sub-sampling the structure of which additionally depends on the character of spatial information.

18. A method as claimed in claim 17, in which a further signal is provided which conveys information as to the movement and/or the character of spatial information of each block, which further signal accompanies said sub-sampled television signal.

19. A method as claimed in claim 17, including the step of subjecting each block to spatial and temporal checking, after determining the degree of movement and/or the character of spatial information.

20. A method as claimed in claim 16, in which a further signal is provided which conveys information as to the movement and/or the character of spatial information of each block, which further signal accompanies said sub-sampled television signal.

21. A method as claimed in claim 20, including the step of subjecting each block to spatial and temporal checking, after determining the degree of movement and/or the character of spatial information.

22. A method as claimed in claim 16, including the step of subjecting each block to spatial and temporal checking, after determining the degree of movement and/or the character of spatial information.

23. Apparatus for processing a high definition signal for conveyance by way of a transmission channel or record carrier, said apparatus comprising means for dividing the picture of said high definition television signal into a plurality of adjacent blocks, means for determining the degree of movement in each block, means for subjecting each block to two dimensional spatial filtering the characteristics of which are determined by the degree of movement, means for subjecting each block so filtered to spatial and temporal sub-sampling the structure of which depends on the said degree of movement, means for reducing the number of lines in a sub-sampled block and means for producing therefrom a sub-sampled television signal having substantially fewer lines per frame than contained in said high definition television signal.

24. Apparatus as claimed in claim 23, in which the means for subjecting each block to sub-sampling and the means for reducing the number of lines in a block is the same means.

25. Apparatus as claimed in claim 23 in which the means for reducing the number of lines in a block comprises a means for subjecting the sub-samples from a block to shuffling.

26. Apparatus as claimed in claim 23, and additionally comprising means for determining the spatial information in each block, the means for subjecting each filtered block to spatial and temporal sub-sampling depending not only on the degree of movement in a block but also the character of its spatial information.

27. Apparatus as claimed in claim 23, additionally comprising means for applying said high definition television signal to a plurality of parallel branches each one of which processes said high definition television signal in a different manner according to a given degree of movement.

28. Apparatus as claimed in claim 27, comprising means for connecting the outputs of said plurality of branches to respective inputs of a branch selection switch the output of said branch switch selecting the output of the appropriate branch according to the degree of movement.

29. Apparatus as claimed in claim 27, in which one of said branches processes said high definition television signal as though it contained no movement or less than a limited degree of movement while a second of said branches processes said high definition television signal as though it contained movement at or above said limited degree, said second branch comprising a plurality of parallel sub-branches each one of which processes said high definition television signal in a different manner according to given characteristics of spatial information.

30. Apparatus as claimed in claim 29, in which said plurality of sub-branches are connected to respective inputs of a sub-branch selection switch the output of which selects the output of the appropriate sub-branch according to the said spatial content.

31. Apparatus as claimed in claim 23, additionally comprising means for generating a further signal which conveys information as to the movement and/or the character of spatial information of each block for accompanying said sub-sampled television signal.

32. Apparatus as claimed in claim 30, comprising means for applying said further signal additionally to said branch switch and/or said sub-branch switch for controlling the selection thereof.

33. Apparatus as claimed in claim 24 and additionally comprising means for determining the spatial information in each block, the means for subjecting each filtered block to spatial and temporal sub-sampling depending not only on the degree of movement in a block but also the character of its spatial information.

34. Apparatus as claimed in claim 25 and additionally comprising means for determining the spatial information in each block, the means for subjecting each filtered block to spatial and temporal sub-sampling depending not only on the degree of movement in a block but also the character of its spatial information.

35. Apparatus as claimed in claim 24, additionally comprising means for applying said high definition television signal to a plurality of parallel branches each one of which processes said high definition television signal in a different manner according to a given degree of movement.

36. Apparatus as claimed in claim 25, additionally comprising means for applying said high definition television signal to a plurality of parallel branches each one of which processes said high definition television signal in a different manner according to a given degree of movement.

37. Apparatus as claimed in claim 26, additionally comprising means for applying said high definition television signal to a plurality of parallel branches each one of which processes said high definition television signal in a different manner according to a given degree of movement.

38. Apparatus as claimed in claim 28, in which one of said branches processes said high definition television signal as though it contained no movement or less than a limited degree of movement while a second of said branches processes said high definition television signal as though it contained movement at or above said limited degree, said second branch comprising a plurality of parallel sub-branches each one of which processes said high definition television signal in a different manner according to given characteristics of spatial information.

39. Apparatus as claimed in claim 24 additionally comprising means for generating a further signal which conveys information as to the movement and/or the character of spatial information of each block for accompanying said sub-sampled television signal.

40. Apparatus as claimed in claim 25 additionally comprising means for generating a further signal which conveys information as to the movement and/or the character of spatial information of each block for accompanying said sub-sampled television signal.

41. Apparatus as claimed in claim 26 additionally comprising means for generating a further signal which conveys information as to the movement and/or the character of spatial information of each block for accompanying said sub-sampled television signal.

42. Apparatus as claimed in claim 27 additionally comprising means for generating a further signal which conveys information as to the movement and/or the character of spatial information of each block for accompanying said sub-sampled television signal.

43. Apparatus as claimed in claim 28 additionally comprising means for generating a further signal which conveys information as to the movement and/or the character of spatial information of each block for accompanying said sub-sampled television signal.

44. Apparatus as claimed in claim 29 additionally comprising means for generating a further signal which conveys information as to the movement and/or the character of spatial information of each block for accompanying said sub-sampled television signal.

45. Apparatus as claimed in claim 30 additionally comprising means for generating a further signal which conveys information as to the movement and/or the character of spatial information of each block for accompanying said sub-sampled television signal.

* * * * *